United States Patent
Shen et al.

(10) Patent No.: US 11,009,001 B2
(45) Date of Patent: May 18, 2021

(54) METHOD FOR MULTI-OBJECTIVE OPTIMAL OPERATIONS OF CASCADE HYDROPOWER PLANTS BASED ON RELATIVE TARGET PROXIMITY AND MARGINAL ANALYSIS PRINCIPLE

(71) Applicant: Dalian University of Technology, Dalian (CN)

(72) Inventors: Jianjian Shen, Dalian (CN); Juntao Zhang, Dalian (CN); Chuntian Cheng, Dalian (CN); Wenjing Niu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 16/606,571

(22) PCT Filed: Dec. 22, 2017

(86) PCT No.: PCT/CN2017/117988
§ 371 (c)(1),
(2) Date: Oct. 18, 2019

(87) PCT Pub. No.: WO2019/119413
PCT Pub. Date: Jun. 27, 2019

(65) Prior Publication Data
US 2020/0271088 A1    Aug. 27, 2020

(51) Int. Cl.
*F03B 15/00* (2006.01)
*F03B 13/06* (2006.01)
*G05B 13/04* (2006.01)

(52) U.S. Cl.
CPC .............. *F03B 15/00* (2013.01); *F03B 13/06* (2013.01); *G05B 13/041* (2013.01)

(58) Field of Classification Search
CPC ........ F03B 15/00; F03B 13/06; G05B 13/041; G05B 17/02; G06Q 10/04
See application file for complete search history.

(56) References Cited

U.S. PATENT DOCUMENTS

| 7,593,839 B1 * | 9/2009 | Wu | G06F 30/13 |
| | | | 703/9 |
| 2007/0168057 A1 * | 7/2007 | Blevins | G05B 13/022 |
| | | | 700/53 |

(Continued)

FOREIGN PATENT DOCUMENTS

| CN | 104036334 A | 9/2014 |
| CN | 204904325 U | 12/2015 |

(Continued)

OTHER PUBLICATIONS

Zhang, Hongxue, et al. "Cascade hydropower plants operation considering comprehensive ecological water demands." Energy Conversion and Management 180 (2019): 119-133. (Year: 2019).*

(Continued)

*Primary Examiner* — Michael D Masinick
(74) *Attorney, Agent, or Firm* — Muncy, Geissler, Olds & Lowe, P.C.

(57) ABSTRACT

The invention relates to the field of hydropower scheduling, and relates to a method for multi-objective optimal operations of cascade hydropower plants based on relative target proximity and marginal analysis principle. The invention constructs an optimization model with relative target proximity by introducing positive and negative ideal points of objectives so that a multi-objective optimization is efficiently handled. A strategy for processing complex operation constraints is proposed and coupled with genetic algorithm to solve the model. Thus, optimal solution sets under different weight coefficients of objectives can be determined. Following this, marginal benefit and marginal cost are (Continued)

introduced to represent a relationship between multiple objective values and corresponding weight coefficients. According to principle of profit maximization in economics, a marginal analysis of objective weight coefficient is finally made to determine benefit-dominant area, cost-dominant area and equilibrium area, and there by obtaining a basis of multi-objective decision-making.

1 Claim, 3 Drawing Sheets

(56) References Cited

U.S. PATENT DOCUMENTS

| | | | | |
|---|---|---|---|---|
| 2013/0124002 | A1* | 5/2013 | Greene | H02J 3/14 700/296 |
| 2013/0138468 | A1* | 5/2013 | Oe | G06Q 50/06 705/7.22 |
| 2016/0094033 | A1* | 3/2016 | Zheng | H02J 3/1821 702/182 |
| 2017/0068760 | A1* | 3/2017 | Shoda | G06F 17/18 |
| 2019/0036341 | A1* | 1/2019 | Asghari | G05B 19/042 |

FOREIGN PATENT DOCUMENTS

| | | |
|---|---|---|
| CN | 105719091 A | 6/2016 |
| CN | 106203689 A | 12/2016 |

OTHER PUBLICATIONS

Cai, Changchun, et al. "Optimal operation of microgrid composed of small hydropower and photovoltaic generation with energy storage based on multiple scenarios technique." 2015 5th International Conference on Electric Utility Deregulation and Restructuring and Power Technologies (DRPT). IEEE, 2015. (Year: 2015).*

* cited by examiner

METHOD FOR MULTI-OBJECTIVE OPTIMAL OPERATIONS OF CASCADE HYDROPOWER PLANTS BASED ON RELATIVE TARGET PROXIMITY AND MARGINAL ANALYSIS PRINCIPLE

TECHNICAL FIELD

The invention relates to the field of hydropower scheduling, focusing on a method for multi-objective optimal operations of cascade hydropower plants based on relative target proximity and marginal analysis principle.

BACKGROUND

Usually, large-scale cascade hydropower plants bear responsibility for comprehensive utilization tasks such as power generation, flood control, water supply, navigation and ecology. Their operations are a typical multi-objective optimization problem. Solving such a problem is very complex, mainly reflected in two aspects. Firstly, from a mathematical point of view, multi-objective optimal operation of hydropower plants is a typical high-dimensional, strong coupling, non-linear optimization problem. In particular, in short-term operations, how to solve the multi-objective optimization problem under highly coupled constraints of temporal-spatial requires efficient solution techniques to take account of both computational efficiency and accuracy of optimization results. Secondly, the multi-objective optimization problem usually faces a huge set of non-inferior solutions. How to avoid the influence of subjective factors and make scientific and objective decisions is another difficulty. At present, there are two main methods to solve multi-objective optimization problems. One is to transform the multi-objective problem into a single-objective problem, including objective weight method, constraint method, sequence optimization method and fuzzy maximum satisfaction method. These methods are simple in principle and easy to implement. In fact, they simplify the original problem and reduce optimization difficulty, but the solution procedure heavily depends on many subjective factors, such as determination of objective weight coefficient, selection of objective for representing as constraints, ranking of objective importance, expansion range of objective value in membership function. These factors are very likely to have a significant impact on calculation results and operational decisions. The other method is to use multi-objective optimization algorithm to obtain Pareto solution set of the optimized problem. This type of methods will not destroy the physical meaning of the multi-objective problem, and can obtain non-inferior solution set that approximates real Pareto front of the problem. An optional set of operation schemes of hydropower plants is given. However, the final decision still depends on subjective orientation or target preference of dispatcher. There is a lack for objective decision-making measures. It is difficult to fully reflect decision-making benefits caused by the influence of multiple objectives.

For the above problems, the invention proposes a method for multi-objective optimal operations of cascade hydropower plants based on relative target proximity and marginal analysis principle, which derives from on the key support project of the National Natural Science Foundation of China (91547201) and the surface project of the National Natural Science Foundation of China (51579029). The invented method is tested by multi-objective optimal operations of cascade hydropower plants in the middle and lower reaches of Lancang River. Results show that the invention can effectively meet multi-objective control requirements of peak shaving and navigation of downstream river, and meanwhile reduce subjective assumption facing traditional multi-objective decision-making methods.

SUMMARY

The invention aims at solving a multi-objective optimal operation of cascade hydropower plants based on relative target proximity and marginal analysis principle. This invention can efficiently solve the multi-objective optimal operation of cascade hydropower plants, and simultaneously analyze the variation of dispatching benefit of hydropower plants with the consideration of multiple objectives by using economic marginal analysis principle. It provides basis for making scientific multi-objective decision-making.

The technical solution of the invention:

A method for multi-objective optimal operations of cascade hydropower plants based on relative target proximity and marginal analysis principle mainly consists of three parts: multi-objective optimization model formulation, model solution and multi-objective decision-making. Specific steps are given as follows:

(1) Set initial calculation conditions, including operation conditions and constraints of hydropower plants, as well as conditions for electric and hydraulic operation demands;

(2) Calculate upper and lower bounds of power dispatch objective $\min(F_1)$ and hydraulic dispatch objective $\min(F_2)$ and respectively denote them as $[F_1^{min}, F_1^{max}]$, $[F_2^{min}, F_2^{max}]$; Formulate an optimization model with relative target proximity to transform a multi-objective optimization problem into a single-objective optimization problem; Transformation steps are described as follows:

Step 1. Obtain positive and negative ideal points: the positive ideal point is denoted as $(F_1^{min}, F_2^{min})$, and the negative ideal point is denoted as $(F_1^{max}, F_2^{max})$;

Step 2. Normalize object vector: objective function values of any a feasible solution are denoted as $F_1$ and $F_2$; objective vector of the solution is represented as $(F_1, F_2)$; this objective vector is normalized as $(g_1, g_2)$, where $g_1=(F_1-F_1^{min})/(F_1^{max}-F_2^{min})$, $g_2=(F_2-F_2^{min})/(F_2^{max}-F_2^{min})$. So the positive and negative ideal points are normalized as (0,0) and (1,1), respectively;

Step 3. Set objective weight coefficients, and calculate weighted distance between the normalized objective vector and the positive and negative ideal points using $$S_1 = \sqrt{\left(\sum_{i=1}^{2}(\lambda_i(g_i-0))^2\right)} \text{ and } S_2 = \sqrt{\left(\sum_{i=1}^{2}(\lambda_i(g_i-1))^2\right)},$$

where $\lambda_i$ is weight coefficient of objective i, i=1, 2;

Step 4. Calculate relative target proximity using $F=S_1/(S_1+S_2)$;

Step 5. Transform a multi-objective problem $$\text{mop}\begin{cases}\min(F_1)\\ \min(F_2)\end{cases}$$

into a single-objective problem min(F).

(3) Solve the single-objective optimization model based on the relative target proximity using genetic algorithm coupled with solution strategy of complex constraints;

Obtain an optimal solution set under different objective weight coefficients and denote it as $\{F_1(\lambda_1^{-1}), F_2(\lambda_2^{-1})\}, \ldots, \{F_1(\lambda_1^{i}), F_2(\lambda_2^{i})\}, \ldots, \{F_1(\lambda_1^{n}), F_2(\lambda_2^{n})\}$, where $\lambda_1^{i}+\lambda_2^{i}=1.0$, $i=1, \ldots, n$; Generally, $\lambda_k^{1}=\lambda_{min}, \ldots, \lambda_k^{i}=\lambda_{min}+(i-1)\Delta\lambda, \ldots, \lambda_k^{n}=\lambda_{max}$, $k=1, 2$; $\Delta\lambda=(\lambda_{max}-\lambda_{min})/(n-1)$; n is number of objective weight coefficients;

(4) Select a coordinated solution from the optimal solution using multi-objective decision-making method based on principle of economic marginal analysis; Detailed steps are given as follows:

Step 1. Define "marginal benefit", "marginal cost" and "output"; "output": objective weight coefficient $\lambda_k^{i}$, where $i=1, \ldots, n$; $k \in \{1, 2\}$, $k=1$; "marginal benefit": percentage of reduction range of objective function $\min(F_1)$ when the objective weight coefficient increases from $\lambda_1^{i}$ to $\lambda_1^{i+1}$, it is denoted as $K_{i,i+1}^{mr}$, $$K_{i,i+1}^{m} = \frac{F_1(\lambda_1^{i+1}) - F_1(\lambda_1^{i})}{F_1^{max} - F_1^{min}};$$

"marginal cost": percentage of increase range of objective function $\min(F_2)$ when the target weight coefficient increases from $\lambda_1^{i}$ to $\lambda_1^{i+1}$, it is denoted as $K_{i,i+1}^{c}$, $$K_{i,i+1}^{c} = \frac{F_2(\lambda_1^{i+1}) - F_2(\lambda_1^{i})}{F_2^{max} - F_2^{min}};$$

Step 2. According to principle of profit maximization in economics: when the marginal benefit is greater than the marginal cost, decision makers should increase output; when the marginal benefit is less than the marginal cost, decision makers should reduce output; when the marginal benefit is equal to the marginal cost, an equilibrium reaches, making maximum profit; Search $\lambda^x$ along direction of increasing output from $\lambda_{min}$ so that $K_{i,i+1}^{m}>0$ and $K_{i,i+1}^{m}>K_{i,i+1}^{c}$ are met in an interval $[\lambda_{min}, \lambda^x)$; The interval is called benefit-dominant area, where increasing "output" can improve comprehensive benefit; Search $\lambda^m$ along direction of "output" reduction from $\lambda_{max}$ so that $K_{i,i+1}^{c}>0$ and $K_{i,i+1}^{m}<K_{i,i+1}^{c}$ are met in an interval $(\lambda^m, \lambda_{max}]$; The intervalis called cost-dominant area, where reducing "output" can improve comprehensive benefit; Interval $[\lambda^x, \lambda^m]$ is an equilibrium area, where "output" can obtain relatively high comprehensive benefit;

Step 3. Choose an optimal solution corresponding to objective weight coefficient in the equilibrium area as a multi-objective coordinated solution.

The method developed in the invention can achieve significant effects. This invention constructs an optimization model with relative target proximity by introducing positive and negative ideal points of objective so that a multi-objective optimization is efficiently handled. A processing strategy for complex operation constraints is proposed and coupled with genetic algorithm to solve the model. Thus, optimal solution sets under different weight coefficients of objectives can be determined. Following this, marginal benefit and marginal cost are introduced to represent a relationship between multiple objective values and corresponding weight coefficients. According to principle of profit maximization in economics, a marginal analysis of objective weight coefficient is finally made to determine benefit-dominant area, cost-dominant area and equilibrium area, and thereby obtaining the basis of multi-objective decision-making. Compared to conventional multi-objective decision-making methods, the invention effectively meets multiple purposes for operations of cascaded hydropower plants, and is beneficial for reducing subjective inference of dispatchers in multi-objective decision-making. The invention also provides a novel technical way for dispatching decision-making of large-scale hydropower plants with comprehensive utilization requirements.

DETAILED DESCRIPTION

Figure 1:
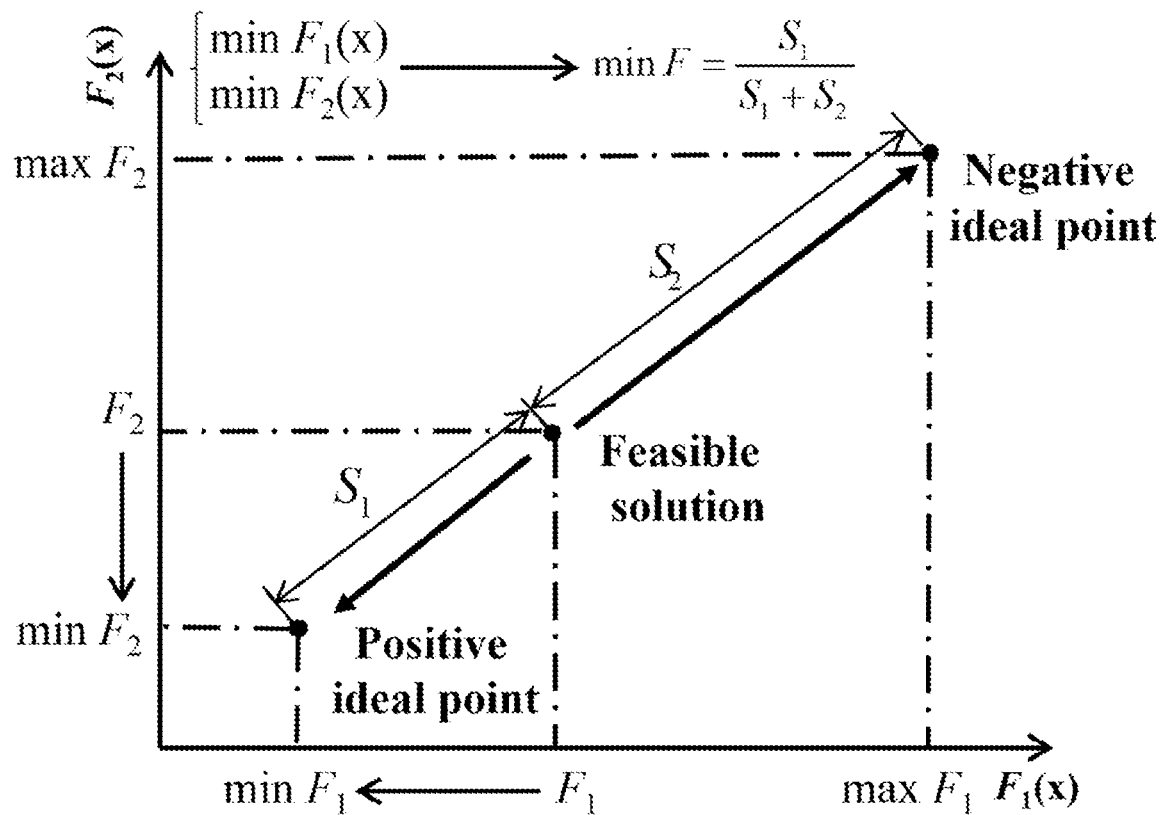
FIG. 1. A schematic diagram of relative target proximity method.
Figure 2:
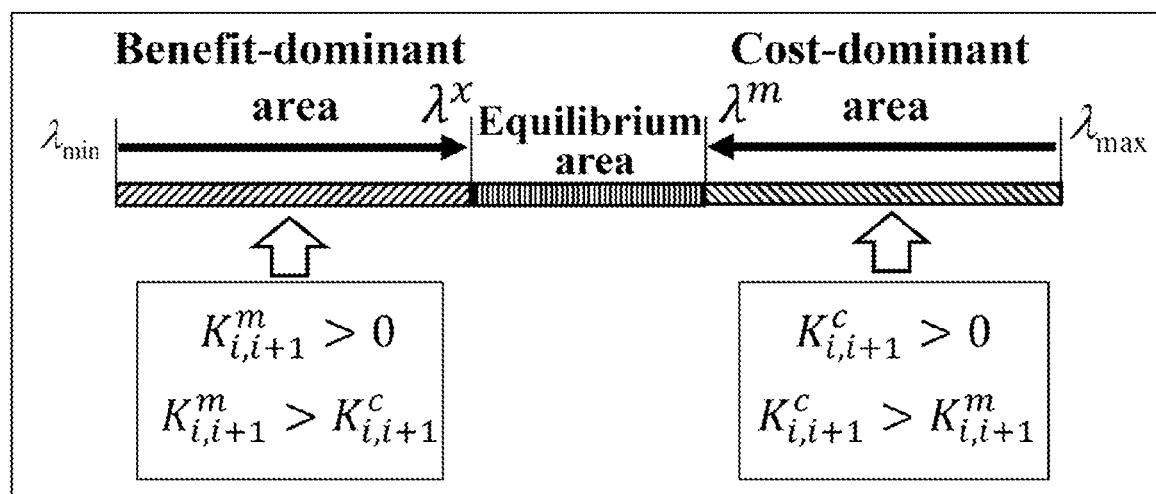
FIG. 2. Process of marginal analysis.

The specific embodiments of the present invention are further described below in conjunction with the drawings and technical solutions.

Usually, large-scale cascade hydropower plants bear responsibility for comprehensive utilization tasks such as power generation, flood control, navigation and ecology. With a rapid development of hydropower construction, joint operations of cascaded hydropower plants on the mainstream are gradually built, and contradiction among these comprehensive utilization requirements is becoming increasingly prominent. Especially, navigation and peak shaving requirements are more acute for cascaded hydropower plants. When hydropower plants work at load peak position, frequent fluctuations of water level in downstream must be caused if there are no effective control measures. This situation will seriously destroy navigation conditions, and directly threaten navigation safety. Constructing a reverse regulation hydropower plant is an inevitable choice for treating this challenge. However, how to coordinate operations of reverse regulation hydropower plant and upstream hydropower plant considering navigation and peak shaving requirements is a common theoretical and practical issue in the operations of power grids and cascaded hydropower plants. There is an urgent need for a feasible method. Therefore, a multi-objective optimization model with peak shaving and navigation is established for such a hydropower system with reverse regulation hydropower plant and upstream hydropower plant. The invention is verified by this case study.

Peak-shaving optimization objective is represented as minimum variance of residual load of a power grid to ensure stability of the residual load and reduce difference between peaks and loads of the residual load. Thus, frequent startup and shutdown of power plants such as thermal power plants with poor regulation performance can be avoided, realizing safety, energy-saving and economy of power system operations.

$$\min F_1 = \frac{1}{T}\sum_{t=1}^{T}\left[\left(N_t - \sum_{m=1}^{M} N_{m,t}\right) - \frac{1}{T}\sum_{t=1}^{T}\left(N_t - \sum_{m=1}^{M} N_{m,t}\right)\right]^2$$

The navigation objective is represented as minimum variance of water level in the downstream channel of reverse regulation hydropower plant to reduce the variation of water level and improve channel flow conditions for meeting the navigation requirement.

$$\min F_2 = \frac{1}{T}\sum_{t=1}^{T}\left(Z_t - \frac{1}{T}\sum_{t=1}^{T}(Z_t)\right)^2$$

The multi-objective optimization model with both peak-shaving and navigation requirements can be described as: under the same control conditions, a water level profile of cascade hydropower plants during one day is searched to minimize variance of the residual load of power system and variance of water level in the downstream channel of reverse regulation hydropower plant during the operational time horizon. The target is to ensure that operation scheme can satisfy both peak regulation and navigation requirements.

$$MOP\begin{cases} \min(F_1) \\ \min(F_2) \end{cases}$$

where T is total number of operational periods; t is time index, t=1, 2, . . . , T; $N_t$ is system load in period t, MW; M is total number of hydropower plants; m is plant index, m=1, 2, . . . , M; $N_{m,t}$ is average generation of plant m in period t, MW; $z_t$ is downstream water level of reverse regulation hydropower plant in period t,m.

The above objective function is subjected to following constraints:

Water balance:

$$V_{m,t+1}=V_{m,t}+3600(Q_{m,t}-S_{m,t})\Delta t$$

where $S_{m,t}=q_{m,t}+d_{m,t}$, $V_{m,t}$ is storage capacity of power plant m at period t,m³; $Q_{m,t}$ is inflow of plant m into reservoir in period t, m³/s; $s_{m,t}$ is outflow of plant m in period t, m³/s; $q_{m,t}$ is turbine discharge of plant m in period t, m³/s; $d_{m,t}$ is spill discharge of plant m in period t, m³/s.

Minimum and maximum forebay water level:

$$\underline{Z}_{m,t} \leq Z_{m,t} \leq \overline{Z}_{m,t}$$

where $\overline{Z}_{m,t}$, $\underline{Z}_{m,t}$ are maximum and minimum forebay water levels of reservoir m in the period t respectively, m.

Water level control target:

$$Z_{m,0}=Z_{m,T}$$

where $Z_{m,0}$ and $z_{m,T}$ are respectively initial water level and final water level of plant m, during the time horizon, m.

Minimum and maximum power generation of each hydropower plant:

$$\underline{N}_{m,t} \leq N_{m,t} \leq \overline{N}_{m,t}$$

where $\overline{N}_{m,t}$ and $\underline{N}_{m,t}$ are upper and lower limits of power generation of plant m in period t respectively, MW.

Maximum generation ramping constraint:

$$|N_{m,t}-N_{m,t+1}| \leq \overline{\Delta N}_m$$

where $\overline{\Delta N}_m$ is upper limit of generation variation in adjacent periods of plant m, MW.

Turbine discharge limitation:

$$\underline{q}_{m,t} \leq q_{m,t} \leq \overline{q}_{m,t}$$

where $\overline{q}_{m,t}$ and $\underline{q}_{m,t}$ are maximum and minimum turbine discharges of plant m in period t respectively, m³/s.

Reservoir discharge limitation:

$$\underline{S}_{m,t} \leq S_{m,t} \leq \overline{S}_{m,t}$$

where $\overline{S}_{m,t}$ and $\underline{S}_{m,t}$ are maximum and minimum reservoir discharge of plant m in period t respectively, m³/s.

Navigation constraints mainly include channel depth limitation, maximum variation limitation of daily water levels, maximum variation limitation of hourly water level, and flow velocity limitation.

$$\min\{h_t,t=1\sim T\} \geq \underline{h}$$

$$\max\{Z_t,t=1\sim T\}-\min\{Z_t,t=1\sim T\} \leq \overline{D_{\Delta Z}}$$

$$\max\{|Z_t-Z_{t+1}|,t=1\sim T-1\} \leq \overline{H_{\Delta Z}}$$

$$\max\{v_t,t=1\sim T\} < \overline{v}$$

where $h_t$ is channel depth in period t,m; $\underline{h}$ is lower limit of channel depth, m; $z_t$ is channel water level in period t, m; $\overline{D_{\Delta Z}}$ is upper limit of daily water level variation, m; $\overline{H_{\Delta Z}}$ upper limit of hourly water level variation, m; $v_t$ is channel flow velocity, m/s; $\overline{v}$ is upper limit of channel flow velocity, m/s.

Navigation constraints are processed as follow.

(1) Processing channel depth limitation. The lower limit of channel depth constraint is transformed into minimum discharge by the following equation.

$$\underline{S}_{m,t}=y(\underline{Z})\underline{Z}=H+\underline{h}$$

where $\underline{Z}$ is lower limit of tailrace water level of reverse regulation power plant; H is bottom elevation of river section near reservoir dam, m; $\underline{h}$ is minimum navigation depth of the downstream river, m; y(·) is relationship between tailrace water level and discharge of a hydropower plant.

(2) Processing maximum variation limitation of water levels. In the invention, this constraint is considered in the optimization objective function to control the variation of water level. The maximum variations of daily water level and hourly water level are taken as indexes for evaluating whether optimization results meet the navigation requirements.

(3) For the flow velocity limitation, maximum flow velocity from historical data commonly satisfies this requirement. Therefore, this invention does not consider the channel flow velocity limitation.

Figure 3:
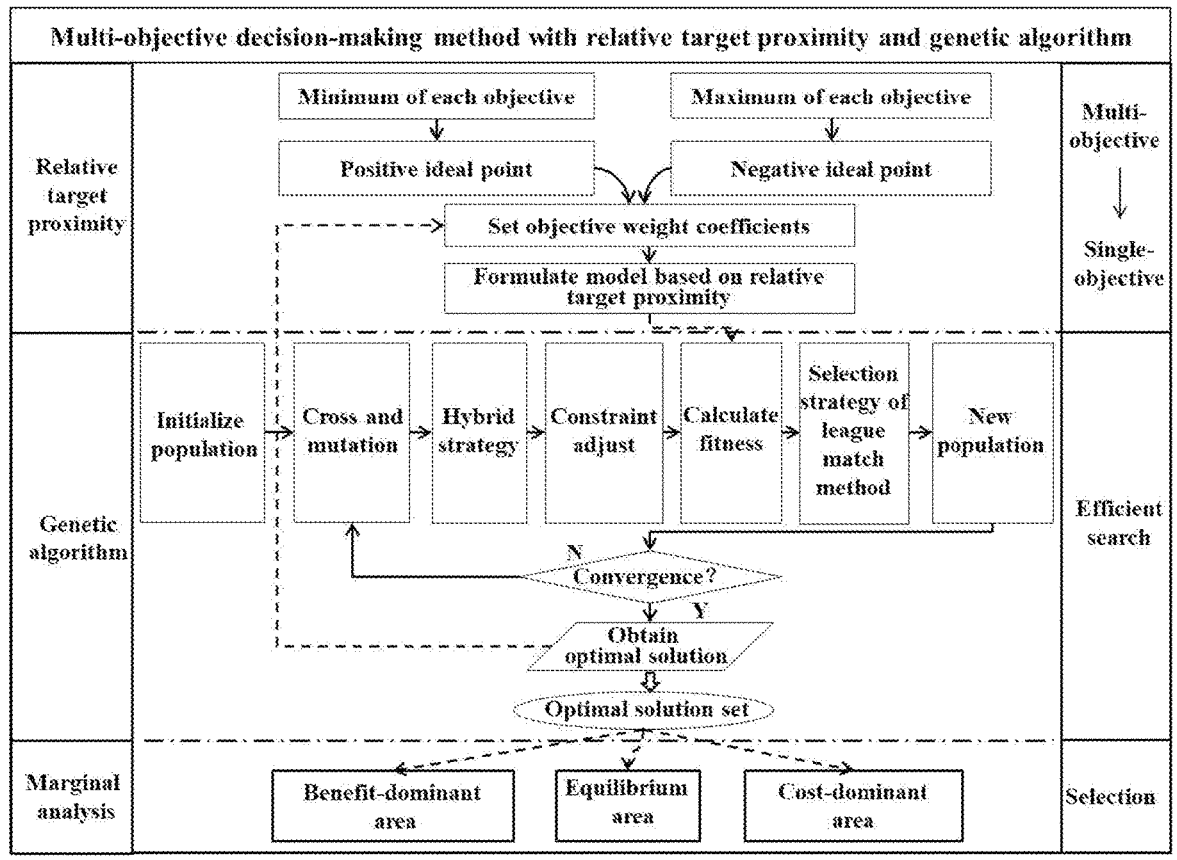
FIG. 3. Whole solution framework of the method developed in the invention.

With the above multi-objective optimization model, a complete application of the achievements of the invention is carried out in accordance with the following steps (1)-(4). A whole solution framework can be found in FIG. 3.

(1) Set initial calculation conditions, including operation conditions and constraints of hydropower plants, as well as conditions for electric and hydraulic operation demands;

(2) Calculate upper and lower bounds of power dispatch objective $\min(F_1)$ and hydraulic dispatch objective $\min(F_2)$ and respectively denote them as $[F_1^{min}, F_1^{max}]$, $[F_2^{min}, F_2^{max}]$; Formulate an optimization model with relative target proximity to transform a multi-objective optimization problem into a single-objective optimization problem; Transformation steps are described as follows:

Step 1. Obtain positive and negative ideal points: the positive ideal point is denoted as $(F_1^{min}, F_2^{min})$, and the negative ideal point is denoted as $(F_1^{max}, F_2^{max})$;

Step 2. Normalize object vector: objective function values of any a feasible solution are denoted as $F_1$ and $F_2$; objective vector of the solution is represented as $(F_1, F_2)$; this objective vector is normalized as $(g_1, g_2)$, where $g_1=(F_1-F_1^{min})/(F_1^{max}, F_1^{min})$, $g_2=(F_2-F_2^{min})/(F_2^{max}-F_2^{min})$. So the positive and negative ideal points are normalized as (0,0) and (1,1), respectively;

Step 3. Set objective weight coefficients, and calculate weighted distance between the normalized objective vector and the positive and negative ideal points using $$S_1 = \sqrt{\left(\sum_{i=1}^{2}(\lambda_i(g_i-0))^2\right)} \text{ and } S_2 = \sqrt{\left(\sum_{i=1}^{2}(\lambda_i(g_i-1))^2\right)},$$

where $\lambda_i$ is weight coefficient of objective i, i=1, 2;

Step 4. Calculate relative target proximity using $F=S_1/(S_1+S_2)$;

Step 5. Transform a multi-objective problem $$mop\begin{cases} \min(F_1) \\ \min(F_2) \end{cases}$$

into a single-objective problem min(F).

(3) Solve the single-objective optimization model based on the relative target proximity using genetic algorithm coupled with solution strategy of complex constraints; Obtain an optimal solution set under different objective weight coefficients and denote it as $\{F_1(\lambda_1^{1}), F_2(\lambda_2^{1})\}, \ldots, \{F_1(\lambda_1^{i}), F_2(\lambda_2^{i})\}, \ldots, \{F_1(\lambda_1^{n}), F_2(\lambda_2^{n})\}$, where $\lambda_1^{i}+\lambda_2^{i}=1.0$, i=1, ..., n; Generally, $\lambda_k^{1}=\lambda_{min}, \ldots, \lambda_k^{i}=\lambda_{min}+(i-1)\Delta\lambda, \ldots, \lambda_k^{n}=\lambda_{max}$, k=1, 2; $\Delta\lambda=(\lambda_{max}-\lambda_{min})/(n-1)$; n is number of objective weight coefficients;

(4) Select a coordinated solution from the optimal solution using multi-objective decision-making method based on principle of economic marginal analysis; Detailed steps are given as follows:

Step 1. Define "marginal benefit", "marginal cost" and "output"; "output": objective weight coefficient $\lambda_k^{i}$, where i=1, ..., n; k∈{1,2}, k=1; "marginal benefit": percentage of reduction range of objective function min($F_1$) when the objective weight coefficient increases from $\lambda_1^{i}$ to $\lambda_1^{i+1}$, it is denoted as $K_{i,i+1}^{mr}$, $$K_{i,i+1}^{m} = \frac{F_1(\lambda_1^{i+1}) - F_1(\lambda_1^{i})}{F_1^{max} - F_1^{min}};$$

"marginal cost": percentage of increase range of objective function min($F_2$) when the target weight coefficient increases from $\lambda_1^{i}$ to $\lambda_1^{i+1}$, it is denoted as $K_{i,i+1}^{c}$, $$K_{i,i+1}^{c} = \frac{F_2(\lambda_1^{i+1}) - F_2(\lambda_1^{i})}{F_2^{max} - F_2^{min}};$$

Step 2. According to principle of profit maximization in economics: when the marginal benefit is greater than the marginal cost, decision makers should increase output; when the marginal benefit is less than the marginal cost, decision makers should reduce output; when the marginal benefit is equal to the marginal cost, an equilibrium reaches, making maximum profit; Search $\lambda^{x}$ along direction of increasing output from $\lambda_{min}$ so that $K_{i,i+1}^{m}>0$ and $K_{i,i+1}^{m}>K_{i,i+1}^{c}$ are met in an interval $[\lambda_{min}, \lambda^{x})$; The interval is called benefit-dominant area, where increasing "output" can improve comprehensive benefit; Search $\lambda^{m}$ along direction of "output" reduction from $\lambda_{max}$ so that $K_{i,i+1}^{c}>0$ and $K_{i,i+1}^{m}<K_{i,i+1}^{c}$ are met in an interval $(\lambda^{m}, \lambda_{max}]$; The interval is called cost-dominant area, where reducing "output" can improve comprehensive benefit; Interval $[\lambda^{x},\lambda^{m}]$ is an equilibrium area, where "output" can obtain relatively high comprehensive benefit;

Step 3. Choose an optimal solution corresponding to objective weight coefficient in the equilibrium area as a multi-objective coordinated solution.

Figure 4:
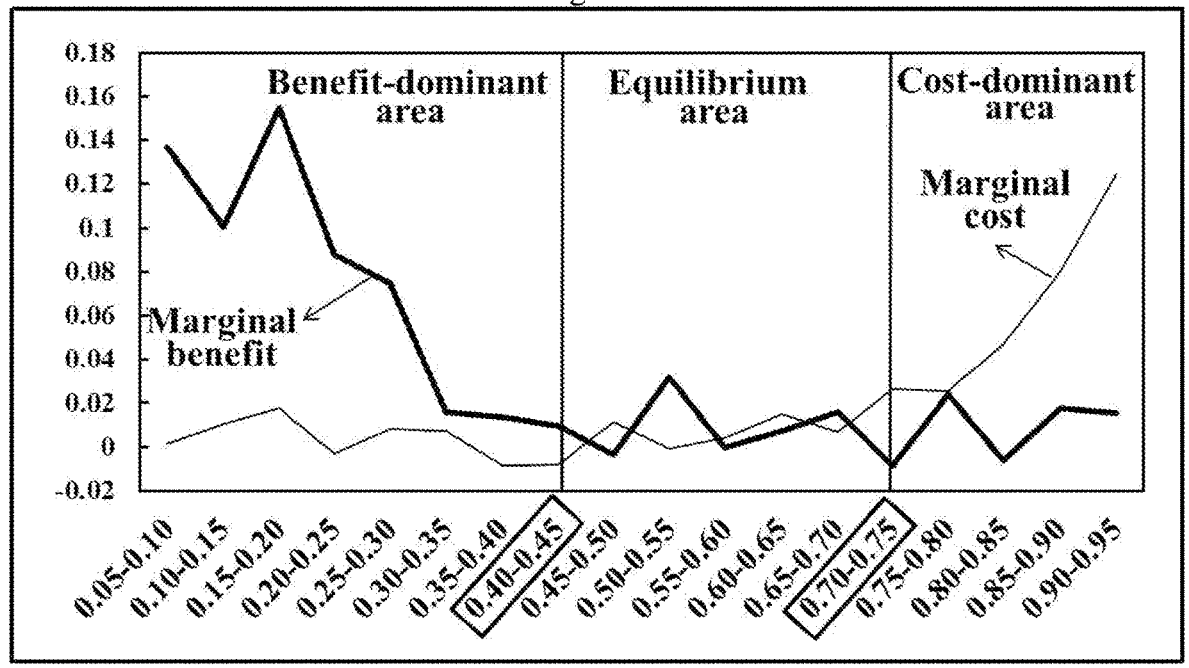
FIG. 4. A process chart for marginal analysis of weighting coefficient of peak shaving objective.
Figure 5:
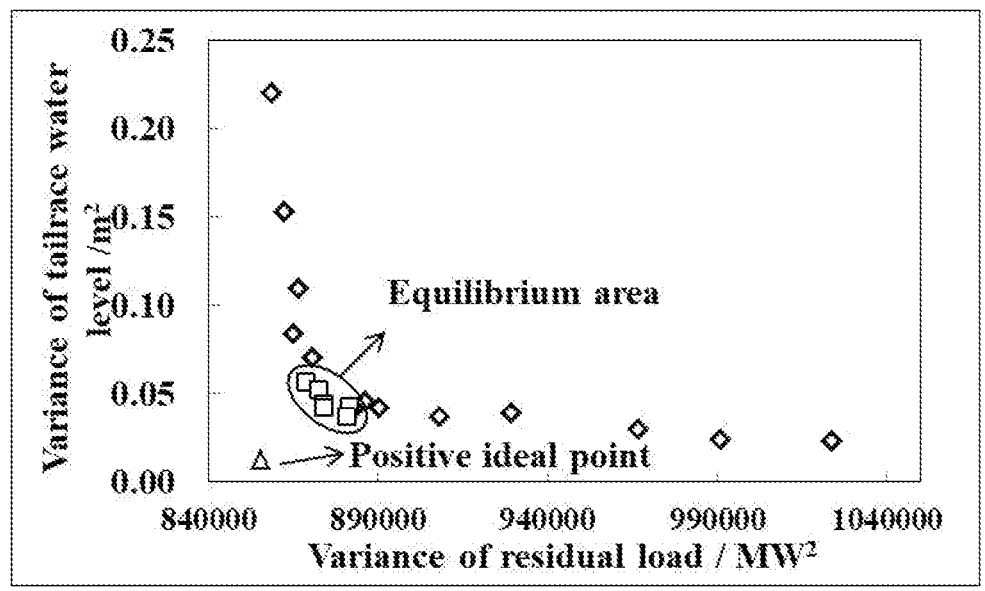
FIG. 5. Optimal solution distribution.

The model and method proposed in the invention is tested by operations of Jinghong-Ganlanba cascaded hydropower plants on the downstream mainstream of Lancang River. Jinghong and Ganlanba hydropower plants are the sixth and seventh plants on the downstream of Lancang River in Yunnan Province. Jinghong hydropower plant is one of main power sources for Yunnan power grid, playing an important role in regulating peak loads of power system. At present, with increasing peak regulation pressure, the contradiction between peak shaving and navigation of downstream river becomes more and more prominent. Ganlanba hydropower plant is located 20 kilometers in the downstream of Jinghong. This plant is a reverse regulation power plant of Jinghong hydropower plant, mainly regulating peaking discharge of Jinghong. The purpose is to improve navigation flow conditions of lower reaches of Jinghong hydropower plant and alleviate the contradiction between peak shaving and downstream navigation requirements. Table 1 shows basic information of hydropower plants. The navigation mileage between two hydropower plants is 30 km, while that of Ganlanba-Nanla Estuary is 80 km. The channel is characterized as grade V, with minimum navigation depth of 2.5 m, maximum daily water level variation of 3.0 m, maximum hourly water level variation of 1.0 m, and maximum flow velocity of 3.0 m. Here, 19 groups of objective weight coefficients are selected for optimization calculation. Table 2 lists optimal solutions under different groups of objective weight coefficients. The equilibrium region of objective weight coefficients is obtained through marginal analysis of peak shaving objective weight coefficients, and is shown in Table 3. The process of marginal analysis is detailed as shown in FIG. 4. FIG. 5 presents optimal solution distribution considering 19 groups of objective weight coefficients. It can be seen that optimal solutions corresponding to the objective weight coefficients in the equilibrium region is closer to the positive ideal point. Two typical objective weight coefficients {0.45-0.55, 0.70-0.30} are selected from the equilibrium region for further analysis and calculation. Results are shown in Table 4. From the view of peak shaving, peak shaving effect of the optimal solution under two groups of objective weight coefficients is satisfactory. Compared with variance of original system load, the variances of residual load decrease by 31.1% and 29.7%, respectively. Peak power capacities are 715 MW and 680 MW, respectively, showing prominent effect of peak shaving. From the view of navigation, optimal solution under the combination of three groups of objective weight coefficients makes channel water level change very smoothly. The variation of daily water levels $D_{AZ}$ and the maximum variation of hourly water levels $H_{AZ}$ are far less than the requirements of V-grade channel. In addition, the channel water level also strictly meets the requirement of the minimum navigation water level (522.5 m) of the downstream channel. Therefore, the optimal solutions selected by marginal analysis of objective weight coefficient can effectively take into account peak shaving and navigation requirements of downstream river, realizing a joint optimal operation of Jinghong-Ganlanba cascaded hydropower plants.

TABLE 1

Basic information of hydropower plants

| Name of power station | Dead water level/m | Normal Water level/m | Installed capacity/MW | Regulation | Minimum discharge/ $m^3 \cdot s^{-1}$ | Maximum turbine discharge/ $m^3 \cdot s^{-1}$ |
|---|---|---|---|---|---|---|
| Jinghong | 591.00 | 602.00 | 1750 | season | 504 | 3327.8 |
| Ganlanba | 535.20 | 539.00 | 155 | day | 504 | 2670.0 |

TABLE 2

Optimal solutions under different groups of objective weight coefficient

| Weight coefficient of peak shaving | Weight coefficient of navigation | $F_1/MW^2$ | $F_2/m^2$ |
|---|---|---|---|
| 0.95 | 0.05 | 858 439 | 0.220 |
| 0.90 | 0.10 | 862 174 | 0.153 |
| 0.85 | 0.15 | 866 451 | 0.110 |
| 0.80 | 0.20 | 864 881 | 0.084 |
| 0.75 | 0.25 | 870 664 | 0.070 |
| 0.70 | 0.30 | 868 536 | 0.056 |
| 0.65 | 0.35 | 872 350 | 0.052 |
| 0.60 | 0.40 | 874 101 | 0.044 |
| 0.55 | 0.45 | 873 948 | 0.042 |
| 0.50 | 0.50 | 881 563 | 0.043 |
| 0.45 | 0.55 | 880 647 | 0.037 |
| 0.40 | 0.60 | 882 939 | 0.041 |
| 0.35 | 0.65 | 886 240 | 0.045 |
| 0.30 | 0.70 | 890 071 | 0.042 |
| 0.25 | 0.75 | 908 008 | 0.037 |
| 0.20 | 0.80 | 929 197 | 0.039 |
| 0.15 | 0.85 | 966 461 | 0.029 |
| 0.10 | 0.90 | 990 695 | 0.024 |
| 0.05 | 0.95 | 1 023 631 | 0.023 |

TABLE 3

Combination of Objective Weight Coefficient in Equilibrium region

Peak shaving objective weight coefficient-navigation objective weight coefficient

| | | |
|---|---|---|
| 0.45-0.55 | 0.55-0.45 | 0.65-0.35 |
| 0.50-0.50 | 0.60-0.40 | 0.70-0.30 |

TABLE 4

Results of optimal solutions of typical objective weight coefficients

| Peak shaving-navigation | $F_1/$ $MW^2$ | $F_2/$ $m^2$ | $\Delta N/$ MW | $D_{\Delta z}/$ m | $H_{\Delta z}/$ m | $Z_{min}/$ m |
|---|---|---|---|---|---|---|
| 0.70-0.30 | 868 978 | 0.062 | 2508 | 0.838 | 0.484 | 529.890 |
| 0.45-0.55 | 885 885 | 0.037 | 2543 | 0.622 | 0.531 | 529.874 |

Note:
$F_1$ is variance of residual load, $F_2$ is variance of tailrace water level, $\Delta N$ is difference between peak and off-peak of residual load.

Note: $F_1$ is variance of residual load, $F_2$ is variance of tailrace water level, $\Delta N$ is difference between peak and off-peak of residual load.

We claim:
1. A method for multi-objective optimal operations of cascade hydropower plants based on relative target proximity and marginal analysis principle, wherein comprising the following steps:

(1) set initial calculation conditions, including operation conditions and constraints of hydropower plants, as well as conditions for electric and hydraulic operation demands;

(2) calculate upper and lower bounds of power dispatch objective min($F_1$) and hydraulic dispatch objective min($F_2$) and respectively denote them as [$F_1^{min}$, $F_1^{max}$], [$F_2^{min}$, $F_2^{max}$]; formulate an optimization model with relative target proximity to transform a multi-objective optimization problem into a single-objective optimization problem; transformation steps are described as follows:

step 1. obtain positive and negative ideal points: the positive ideal point is denoted as ($F_1^{min}$, $F_1^{min}$), and the negative ideal point is denoted as ($F_1^{max}$, $F_2^{max}$);

step 2. normalize object vector: objective function values of any a feasible solution are denoted as $F_1$ and $F_2$; objective vector of the solution is represented as ($F_1$, $F_2$); this objective vector is normalized as ($g_1$, $g_2$), where $g_1=(F_1-F_1^{min})/(F_1^{max}, F_2^{min})$, $g_2=(F_2-F_2^{min})/(F_2^{max}-F_2^{min})$; so the positive and negative ideal points are normalized as (0,0) and (1,1), respectively;

step 3. set objective weight coefficients, and calculate weighted distance between the normalized objective vector and the positive and negative ideal points using $$S_1 = \sqrt{\left(\sum_{i=1}^{2}(\lambda_i(g_i-0))^2\right)} \text{ and } S_2 = \sqrt{\left(\sum_{i=1}^{2}(\lambda_i(g_i-1))^2\right)},$$

where $\lambda_i$ is weight coefficient of objective i, i=1, 2;

step 4. calculate relative target proximity using $F=S_1/(S_1+S_2)$;

step 5. transform a multi-objective problem $$mop\begin{cases} \min(F_1) \\ \min(F_2) \end{cases}$$

into a single-objective problem min(F);

(3) solve the single-objective optimization model based on the relative target proximity using genetic algorithm coupled with solution strategy of complex constraints; obtain an optimal solution set under different objective weight coefficients and denote it as {$F_1(\lambda_1^1)$, $F_2(\lambda_2^1)$}, ..., {$F_1(\lambda_1^i)$, $F_2(\lambda_2^i)$}, ..., {$F_1(\lambda_1^n)$, $F_2(\lambda_2^n)$}, where $\lambda_1^i+\lambda_2^i=1.0$, i=1, ..., n; generally, $\lambda_k^1=\lambda_{min}$, ..., $\lambda_k^i=\lambda_{min}+(i-1)\Delta\lambda$, ..., $\lambda_k^n=\lambda_{max}$, k=1, 2; $\Delta\lambda=(\lambda_{max}-\lambda_{min})/(n-1)$; n is number of objective weight coefficients;

(4) select a coordinated solution from the optimal solution using multi-objective decision-making method based on principle of economic marginal analysis; detailed steps are given as follows:

step 1. define "marginal benefit", "marginal cost" and "output"; "output": objective weight coefficient $\lambda_k^i$, where i=1, ..., n; k∈{1, 2}, k=1; "marginal benefit": percentage of reduction range of objective function min($F_1$) when the objective weight coefficient increases from $\lambda_1^i$ to $\lambda_1^{i+1}$, it is denoted as $K_{i,i+1}^{mr}$, $$K_{i,i+1}^m = \frac{F_1(\lambda_1^{i+1}) - F_1(\lambda_1^i)}{F_1^{max} - F_1^{min}};$$

"marginal cost": percentage of increase range of objective function min($F_2$) when the target weight coefficient increases from $\lambda_1^i$ to $\lambda_1^{i+1}$, it is denoted as $K_{i,i+1}^c$;

$$K_{i,i+1}^c = \frac{F_2(\lambda_1^{i+1}) - F_2(\lambda_1^i)}{F_2^{max} - F_2^{min}};$$

step 2. according to principle of profit maximization in economics: when the marginal benefit is greater than the marginal cost, decision makers should increase output; when the marginal benefit is less than the marginal cost, decision makers should reduce output; when the marginal benefit is equal to the marginal cost, an equilibrium reaches, making maximum profit; search $\lambda^x$ along direction of increasing output from $\lambda_{min}$ so that $K_{i,i+1}^m$>0 and $K_{i,i+1}^m$>$K_{i,i+1}^c$ are met in an interval [$\lambda_{min}$, $\lambda^x$); the intervalis called benefit-dominant area, where increasing "output" can improve comprehensive benefit; search $\lambda^m$ along direction of "output" reduction from $\lambda_{max}$ so that $K_{i,i+1}^c$>0 and $K_{i,i+1}^m$<$K_{i,i+1}^c$ are met in an interval $\lambda^m$, $\lambda_{max}$]; the intervalis called cost-dominant area, where reducing "output" can improve comprehensive benefit; interval [$\lambda^x$, $\lambda^m$] is an equilibrium area, where "output" can obtain relatively high comprehensive benefit;

step 3. choose an optimal solution corresponding to objective weight coefficient in the equilibrium area as a multi-objective coordinated solution and use the optimal solution to operate the cascade hydropower plants.

\* \* \* \* \*